July 26, 1960  A. W. LAUER, JR  2,946,223
GAUGE GUARD
Filed April 9, 1956

INVENTOR
ALBERT W. LAUER, JR.
BY
ATTORNEY

United States Patent Office 2,946,223
Patented July 26, 1960

2,946,223

GAUGE GUARD

Albert W. Lauer, Jr., Emmaus, Pa., assignor to Air Products Incorporated, a corporation of Michigan Filed Apr. 9, 1956, Ser. No. 576,929

2 Claims. (Cl. 73—431)

This invention relates to the protection of fluid pressure regulating and indicating devices of the type commonly employed for controlling and indicating the pressure of gases stored in cylinders at high pressure and more particularly to a unitary device for guarding the pressure regulator and gauges associated with such cylinders.

Gases useful in certain industrial processes are commonly stored in cylinders at high pressure. For example, in the art of gas welding it is customary for the manufacturer to compress the desired gas as it is manufactured into relatively heavy metallic cylinders of a diameter, length and weight convenient for storage and for easy transportation from job to job by a welder using the same. The gas storage cylinders are generally filled under high pressure in an effort to provide a maximum quantity of gas in a given number of cylinders. Thus, it is apparent that the supply source of the desired welding gas is at a high pressure and since the pressure required for most uses is comparatively low, such as required by a welding torch, it is necessary for the welder to use a pressure regulating device, including pressure indicating attachments, for the purpose of reducing and controlling the pressure of the gas drawn from the storage cylinder. By far the most common method of accomplishing this result is by providing a pressure regulating and indicating device comprising a pressure regulator having suitable connections for attachment to the valve assembly of a gas storage cylinder and to the draw-off line. It is customary to provide at least two gauges associated with the pressure regulator, i.e., one gauge for indicating the pressure in the gas storage cylinder and a second gauge for indicating the draw-off pressure. The gauges are commonly mounted on the pressure regulator and without protection of any nature from damage in the handling of the cylinder or from other sources of physical impact.

It is apparent that the pressure regulating and indicating devices of the prior art have generally been constructed and assembled as a unit which may be easily damaged during use. The gauges associated with the pressure regulator are particularly subject to damage due to their relatively fragile and delicate nature and since these gauges are costly items, it would be highly desirable to provide some means for their protection. Prior to the present invention no practical gauge guards have been proposed, constructed and designed so that two or more independent gauges could be nested together within the same gauge guard. The device of the present invention provides substantially complete protection from the more common sources of damage and yet in such a manner that the pressure indicating needles of the various independent gauges are clearly visible to the user at all times. Further, none of the gauge guards of the prior art have been so constructed and designed as to be easily and quickly installed upon existing equipment to thereby provide a guarded pressure regulating and indicating device.

The many disadvantages and inherent deficiencies of the prior art pressure regulating and indicating devices may be largely overcome by providing a guarded pressure regulating and indicating device designed and constructed in accordance with the present invention. Further, the gauge guard disclosed herein is easily manufactured at low cost, convenient to install and use on conventional pressure regulating and indicating devices and offers substantially complete protection against the more common hazards gauges have heretofore been subjected to while in use.

Accordingly, it is an object of the present invention to provide a guarded pressure regulating and indicating device of novel structure and design for use on a gas storage cylinder.

It is a further object of the present invention to provide a gauge guard for a conventional pressure regulating and indicating device that will effectively protect a plurality of individual gauges associated therewith from damage by the more common hazards gauges are subjected to while in use, and yet which is of such design and structure as to allow an operator to easily view the faces of the various individual gauges simultaneously.

It is still a further object of the present invention to provide a gauge guard which may be conveniently and quickly installed on existing pressure regulating and indicating devices, and which may be manufactured at low cost.

Still further objects of the present invention will become apparent to those skilled in the art as the invention is better understood by reference to the following detailed description and the drawing, in which.

Figure 1:
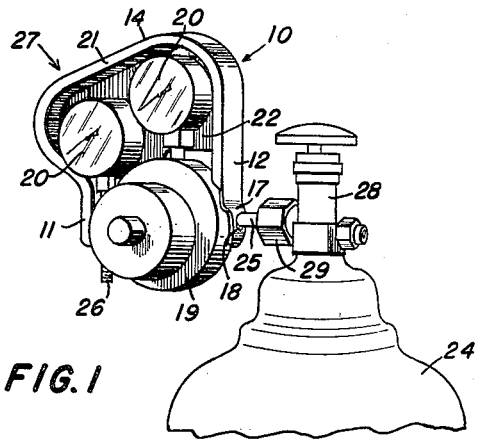
Fig. 1 is a perspective view showing the front of the guarded pressure regulating and indicating device of the invention in place on a gas storage cylinder.

Referring now to the drawing and more particularly to Fig. 1, a guarded pressure regulating and indicating device 27 constructed in accordance with a presently preferred embodiment of the invention is illustrated connected in place on gas storage cylinder 24. It may be seen that device 27 is supported on cylinder 24 by gas inlet tube 25. Inlet tube 25 is threaded on its outer end, and connected to cylinder 24 through a threaded fitting on valve assembly 28 by means of coupling nut 29, as is conventional in the art.

Figure 2:
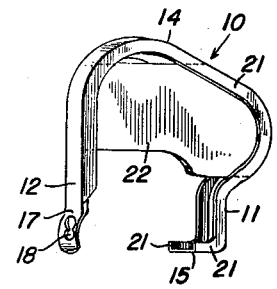
Fig. 2 is a perspective view of the rear of a gauge guard constructed in accordance with the invention.
Figures 3, 4, 5:
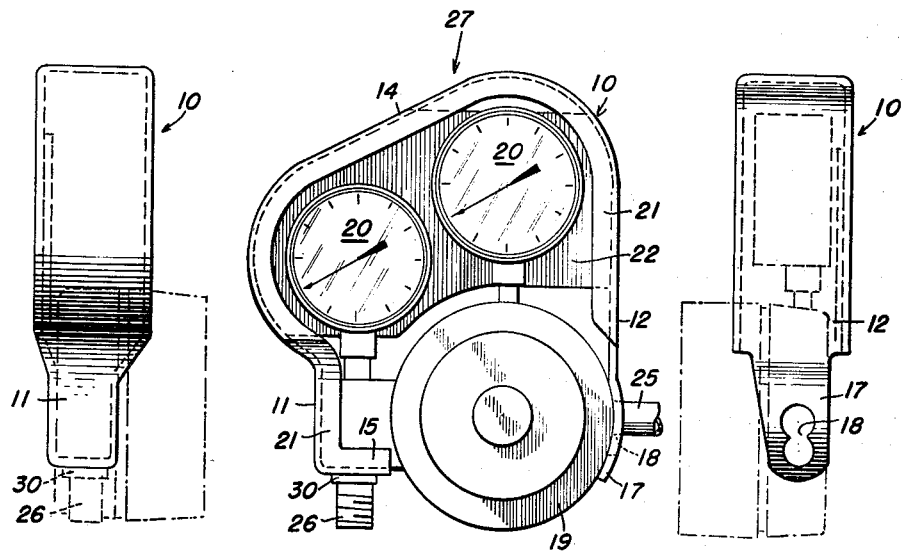
Fig. 3 is a front view of the guarded pressure regulating and indicating device of the invention, and particularly showing the gauge guard installed on a well known pressure regulating and indicating device.
Fig. 4 is a side view showing one side of the gauge guard of the invention.
Fig. 5 is a side view showing the side of the gauge guard of the invention opposite the side shown in Fig. 4.
Figure 6:
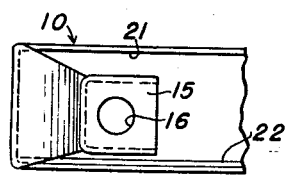
Fig. 6 is a fragmentary bottom view of the gauge guard of the invention.

Referring now to Fig. 2, the gauge guard 10 comprises a body of generally U-shaped configuration having a pair of oppositely disposed leg portions 11 and 12 joined by an intermediate portion 14. Portion 11 terminates in an end or mounting portion 15 extending inwardly and forming approximately a 90° angle with portion 11, while portion 12 is provided with an end or mounting portion 17 which is curved outward somewhat to conform to the curvature of pressure regulator housing 19. As may be best seen in Fig. 6, mounting portion 15 has a flat under surface provided with an opening 16. Mounting portion 17 is also provided with at least one opening and preferably with two openings 18, as best seen in Fig. 4, for the purpose of adapting gauge guard 10 to fit two or more sizes of pressure regulating and indicating devices. The gauge guard 10 with the exception of mounting portion 17 is provided on either side with inwardly turned flange portions 21 which may be formed by folding the outer edges thereof inwardly to approximately 90°. A cross member 22 extends across the rear edges of intermediate portion 14 to provide additional protection for the rear surfaces of the gauges and to strengthen the gauge guard. The intermediate portion 14 has a width substantially greater than gauges 20, as best seen in Figs. 4 and 5.

Referring now to Fig. 3, the gauge guard 10 is shown installed on a conventional pressure regulating and indicating device 27 having a pair of outwardly facing gauges 20 suitably mounted on the upper portion of pressure regulator housing 19. It will be seen that the gas inlet tube 25 and the gas outlet connection 26 are arranged on opposite sides of the generally cylindrical pressure regulator housing 19 and with the inlet tube 25 being substantially horizontal while outlet connection 26 is substantially vertical. The outlet connection 26 is provided with a flat upper shoulder 30 and both inlet tube 25 and outlet connection 26 are preferably attached to regulator housing 19 by means of the usual threaded connections. The gauge guard 10 is supported on regulator housing 19 by outlet connection 26 and inlet tube 25, which are inserted through annular openings 16 and 18 respectively. When the gauge guard 10 is properly installed, it will be noted that the gauge encompassing portion 14 extends above and to either side of gauges 20 and with cross member 22 arranged so as to protect the rear surface of the gauges 20. This arrangement allows the faces of gauges 20 to be viewed simultaneously as well as providing a maximum degree of protection.

Preferably, the leg portions 11 and 12 are so spaced and their respective openings 16 and 18 so arranged as to provide a distance between openings 16 and 18 which is somewhat less than the distance between the gas inlet tube 25 and the gas outlet connection 26 at their points of attachment to the regulator housing 19. Thus it is necessary to flex the leg portions 11 and 12 outwardly in order to snap the gauge guard 10 into position on regulator housing 19. This spring attachment feature of the preferred embodiment ensures a snug fit between the gauge guard 10 and regulator housing 19 at all times, and further permits quick and easy installation or removal of the gauge guard.

It will be readily seen that the gauge guard 10 may be easily installed on a conventional regulator housing 19 by first removing inlet tubing 25 and outlet connection 26, and then flexing the upright portions 11 and 12 of gauge guard 10 outwardly to allow mounting portions 15 and 17 to be slipped into place. The inlet tube 25 and outlet connection 26 are then inserted through openings 18 and 16, respectively, and connected back in position on regulator housing 19.

The gauge guard 10 of the invention, with the exception of cross member 22, is preferably constructed from a single piece of relatively heavy sheet metal and may be formed into the desired configuration by any suitable method such as by stamping, etc. The cross member 22 is preferably formed separately from similar material and then welded to the rear edge or flange of the gauge encompassing portion. However, obviously other suitable materials or methods of manufacture may be used.

While a specific embodiment of the present invention is illustrated and described herein, it is to be understood that the invention is not limited thereto, or other than by the spirit and scope of the appended claims.

What is claimed is:

1. A gauge guard for use with pressure regulating and indicating apparatus of the class including a pressure regulator for compressed gases having a housing, at least one gauge for indicating the pressure of gases mounted on the regulator housing, a gas inlet tube leading from a source of compressed gas into the pressure regulator and a gas outlet tube leading from the pressure regulator, the gauge being mounted on one side of the regulator housing, the gas inlet tube and gas outlet tube leading from spaced portions of the other side of the regulator housing, and the gauge, gas inlet tube and gas outlet tube at their points of mounting on the regulator housing lying in approximately the same vertical plane, the gauge guard comprising a body of generally U-shaped configuration and the legs of the body being adapted to be removably mounted on the apparatus at spaced points, one leg of the body having an opening formed therein adjacent the end to receive the gas inlet tube, the other leg of the body having an opening formed therein adjacent the end to receive the gas outlet tube, the legs of the body being formed in spaced relation with the distance between their respective openings being less than the distance between their points of mounting, the legs of the body being flexible outwardly thereby allowing the legs to be flexed and the gauge guard to be held in place without being rigidly connected to the regulator housing and the gauge guard to be supported on the gas inlet tube and gas outlet tube with each leg of the body fitting snugly against the regulator housing, the intermediate portion of the body being formed to surround the gauge in spaced relation thereto and being of U-shaped cross section thereby forming strengthening and protective flanges projecting toward the gauge, and a member extending across the intermediate portion of the body and arranged to cover the rear of the gauge in spaced relation thereto.

2. A gauge guard for use with pressure regulating and indicating apparatus of the class including a pressure regulator for compressed gases having a housing, a plurality of gauges for indicating the pressure of gases mounted on the regulator housing, a gas inlet tube leading from a source of compressed gas into the pressure regulator and a gas outlet tube leading from the pressure regulator, the plurality of gauges being mounted in spaced relationship on one side of the regulator housing and so as to face in the same general direction, the gas inlet tube and gas outlet tube leading from spaced portions of the other side of the regulator housing, the gauges being mounted above the gas inlet tube and gas outlet tube with the gauges, gas inlet tube and gas outlet tube at their points of mounting lying in approximately the same vertical plane, the regulator housing being supported by the gas inlet tube, the gas inlet tube being approximately horizontal in the vicinity of the regulator housing, and the gas outlet tube extending downward from the regulator housing and having a shoulder formed thereon near the regulator housing, the gauge guard comprising a body of generally U-shaped configuration, the legs of the body being adapted to be removably mounted on the apparatus at spaced points with the body lying in approximately the same vertical plane as the gauges, one leg of the body having an opening formed therein adjacent the end to receive the gas inlet tube, the other leg of the body being bent inward near the end to form an approximately horizontal end portion having an opening formed therein adjacent the end to receive the gas outlet tube with the horizontal end portion resting on the shoulder thereof, the legs of the body being formed in spaced relation with the distance between their respective openings being less than the distance between their points of mounting, the legs of the body being flexible outwardly thereby allowing the legs to be flexed and the gauge guard to be held in place without being rigidly connected to the regulator housing and the gauge guard to be supported on the gas inlet tube and gas outlet tube with each leg of the body fitting snugly against the regulator housing, the intermediate portion of the body being formed to surround the gauge in spaced relation thereto and being of U-shaped cross section thereby forming strengthening and protective flanges projecting toward the gauges, at least the leg provided with the opening receiving the gas outlet tube having strengthening flanges spaced to be adjacent the regulator housing, and a member extending across the intermediate portion of the body and arranged to cover the rear of the gauges in spaced relation thereto.

References Cited in the file of this patent

UNITED STATES PATENTS

| | | |
|---|---|---|
| D. 166,330 | Matasovic | Apr. 1, 1952 |
| 545,727 | Rockstrok et al. | Sept. 3, 1895 |
| 1,528,958 | Spring | Mar. 10, 1925 |
| 2,529,605 | Gustafson | Nov. 14, 1950 |